UNITED STATES PATENT OFFICE 2,232,289

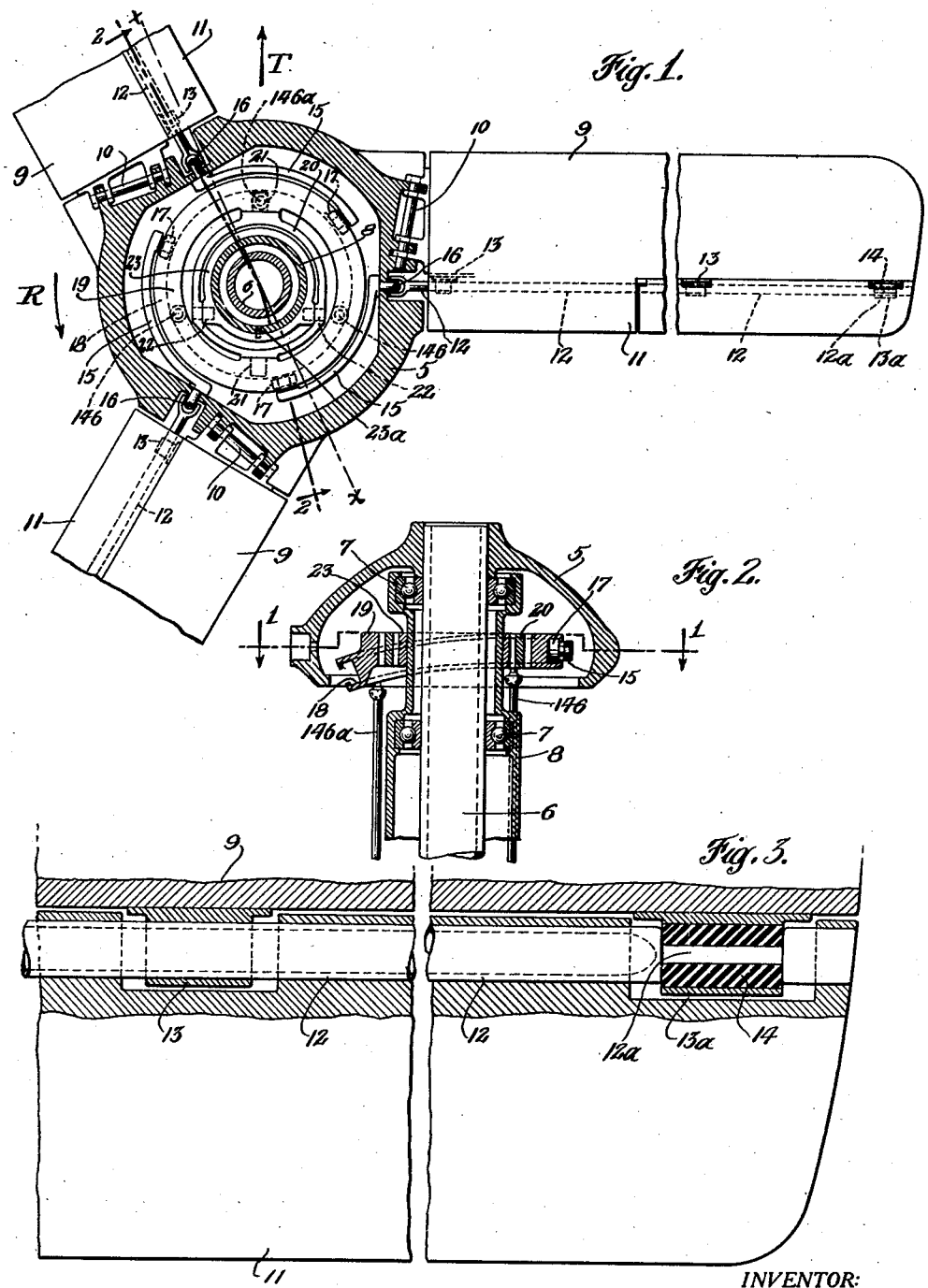

AIRCRAFT HAVING A SUSTAINING ROTOR

Ralph H. Upson, Ann Arbor, Mich., assignor to Autogiro Company of America, Willow Grove, Pa., a corporation of Delaware Application December 9, 1939, Serial No. 308,335

15 Claims. (Cl. 244—17)

This invention relates to aircraft of the type equipped with one or more sustaining rotors adapted to be either positively driven or aerodynamically rotated. The invention is applicable to such rotors regardless of the number of blades incorporated therein.

More particularly, the invention is concerned with the type of sustaining rotor in which at least the most effective area of the blade or blades has freedom for flapping, for example by connection with the hub by a pivot or other means providing freedom for blade swinging movement, at least a component of which swinging movement takes place in the "flapping" sense, i. e., in a direction transverse the rotative path of travel of the blade. Such pivotal mounting of the blade relieves gyroscopic forces which would otherwise produce upsetting moments as a result of movement of the rotor, especially when maneuvering the aircraft; and the pivotal mounting further relieves the effect of air "bumps."

In aircraft of this type, during translational flight, the blade on the advancing side of the rotor encounters the air at a much higher velocity than the blade on the retreating side of the rotor, and many rotative winged aircraft as heretofore constructed relied upon flapping of the blades on their pivotal mountings to compensate for the differential lift effect resulting from different air speeds on the advancing and retreating sides. Furthermore, in prior aircraft of this type, provision has been made for controllably shifting the lift line of the rotor in order to maneuver the craft, this being accomplished either by tilting the rotor axis member to which the blades are pivotally connected, or by imposing periodic variation in effective geometric pitch angle of the blade relative to the axis member in a sense setting up the desired controlling moment. An example of the foregoing general type of aircraft, and also of the differential type of pitch control, appears in my prior Patent No. 2,021,470, issued November 19, 1935.

The present invention is primarily concerned with improvement in control and differential lift compensation in an aircraft equipped with rotative sustaining blades of the "flappingly" pivoted type.

To consider certain of the advantages more in detail, assume a condition of translational flight at the normal cruising speed of the aircraft and with the aircraft carrying an approximately normal load. Under these conditions, the flappingly pivoted type of rotative sustaining blade is subject to differential airflow on the advancing and retreating sides resulting in a given degree of flapping movement, the flapping or coning angle reaching a maximum at a point shortly beyond the forwardmost position of the blade and a minimum at a point shortly beyond the rearward-most position of the blade. This flapping action is effective to eliminate the basic dissymmetry of lift which would otherwise be present in translational flight, but certain roughness and inequalities of lift distribution over the rotor disc still remain or are introduced by virtue of the flapping, especially at high translational flight speeds when the variations in flapping angle are of considerable magnitude. Furthermore, during a control operation to maneuver the craft (as by imposing a periodic differential variation in effective pitch) various of these detrimental effects have been augmented.

With the foregoing in mind, the present invention provides a pitch control mechanism, which is in part automatic and in part manually controllable, which control mechanism minimizes flapping movements of the blades set up as a result of differential air speed on the advancing and retreating sides of the rotor and as a result of differential pitch control imposed for the purpose of maneuvering the craft.

As to the automatic phase of pitch control, the invention contemplates periodic decrease and increase of rotor blade pitch, the decrease and increase lying, in general, on the advancing and retreating sides of the rotor, respectively, the amplitude of decrease on the advancing side of the rotor (where the air speed is high) being considerably smaller than the amplitude of pitch increase on the retreating side of the rotor (where the air speed is lower). In this way, flapping movement of the rotor blades to compensate for differential lift effects in translational flight are minimized and, in fact, may be substantially eliminated at any chosen or predetermined translational speed and loading. With this in mind, in the preferred arrangement, the automatic periodic decrease and increase of pitch on the advancing and retreating sides of the rotor are of such magnitude as to substantially eliminate blade flapping at a translational speed in the neighborhood of the normal cruising speed and with a loading representing a normal average loading.

As to the manually operable phase of periodic differential pitch control, the invention contemplates differential pitch variation on the advancing and retreating sides of the rotor for fore and aft control, which pitch variation is greater on the retreating side of the rotor (where the air speed is low) than on the advancing side of the rotor (where the air speed is high).

In accordance with another aspect of the invention, the pitch control mechanism (both as to automatic and as to manual operation) is so arranged that the effective geometric pitch of each blade is altered to a greater extent in an inboard portion of the blade than in an outboard portion thereof, this for the reason that the inboard portions of the blades are subject to airflow at lower speed than the outboard portions thereof, so that larger variation in angle of attack is necessary in an inboard portion to bring about any desired difference in amount of lift derived therefrom. It can readily be shown that the so-called "induced drag" would be a minimum for uniform distribution of load over the entire disc area. While, generally speaking the above-mentioned radial variation of pitch change will contribute to this desirable condition, the preferred amount of such variation will be premised on various factors entering into the specific design, such as initial twist of the blades, radial variation of section shape, elastic twist from aerodynamic moments, and other factors familiar to engineers skilled in the art.

By virtue of the several features mentioned above, the flapping movement of pivotally mounted sustaining rotor blades is greatly reduced, and the disc loading rendered more uniform, in consequence of which the angle of the mean rotor disc in translational flight may be reduced, thereby enhancing performance; and various disadvantages mentioned above are eliminated or minimized.

How the foregoing objects and advantages are attained will appear more fully from the following description, referring to the accompanying drawing, in which—

Figure 1 is a top view of a rotor system constructed in accordance with this invention, the rotor hub being shown in horizontal section and the blades being broken off or broken out to enable illustration on a larger scale;

Figure 2 is a vertical sectional view through the hub taken as indicated by the line 2—2 on Figure 1; and Figure 3 is a fragmentary plan view of an outer tip portion of one of the rotor blades, with certain parts shown in horizontal section.

The rotor hub member is indicated at 5, the hub being mounted at the upper end of a shaft 6 which, in turn, is carried in bearings 7—7 in a non-rotative hub support 8. The shaft 6 may be positively driven, either normally (for helicopter type operation) or for purposes of starting the rotor prior to take-off (in an aircraft of the type in which the rotor is normally aerodynamically rotated). Preferably, the shaft is coupled with an engine in the body of the craft, such as a forward propulsion engine, through a drive incorporating one or more clutches (desirably including an overrunning clutch), depending upon the type of operation contemplated or desired, as illustrated, for example, in de la Cierva U. S. Patent No. 1,673,232.

Each blade 9 is connected with the hub 5 by means of a flapping pivot 10 which, for reasons brought out more fully in my prior patent above referred to, may be obliquely inclined (as shown) in a direction such that, when viewed in plan, the hinge axis forms an acute angle with the longitudinal blade axis on the leading side of the latter. It may here be noted, however, that the obliquity of this axis may for certain purposes be eliminated, and a flapping pivot perpendicular to the blade axis may be employed.

While for pitch control purposes the entire blade may be mounted to move substantially about its longitudinal axis, for various reasons which will appear more clearly as this description proceeds, I prefer to alter the blade pitch by equipping each blade with a trailing edge flap 11 which extends throughout a considerable length of the blade, preferably the outer portion beyond the point which has zero air speed on the retreating side of the rotor. Thus, as shown in Figure 1, the flap terminates at its inner end at a point spaced substantially from the hub. Upward and downward movement of this flap changes the blade section and results in decrease and increase of the effective geometric pitch angle, respectively. Each flap is mounted on and fixedly connected with a torque tube 12, which latter is journalled in straps or bearings 13 carried by the forward section of the blade 9.

With substantial torsional flexibility in the blade flap 11 and the torque tube 12, the forces acting on the flap are such that rotation of the torque tube would produce materially greater pitch change in an inboard portion of the blade than in an outboard portion thereof, this difference of pitch change as between inboard and outboard portions of the blade being desirable for reasons already indicated. While the difference in pitch just referred to may in some cases be made sufficient for the purposes contemplated merely by providing relatively large torsional flexibility of the flap and torque tube, in other cases the outermost strap 13a for the torque tube is preferably arranged to have non-rotative engagement with a rubber sleeve, or the equivalent, surrounding and attached to the reduced section 12a of the torque tube. This increases the difference in pitch change as between inboard and outboard portions of the blade, resulting in pitch change in an inboard portion of considerably greater magnitude than in an outboard portion. A still greater difference may be had by reducing the thickness of the rubber sleeve to the vanishing point, thus in effect fixing the outer end of the flap to the blade.

Control of each torque tube is secured by means of an arm or horn 15, one end of which is connected with the torque tube 12 through a universal joint 16, the axes of which intersect at the axis of the flapping pivot 10 so that flapping movement of the blade does not affect pitch control. The free or inner end of each horn 15 carries a roller 17 fitting and riding in a cam track 18 formed in the periphery of a cam plate 19. The cam plate, in turn, is pivotally mounted on a gimbal ring 20 by means of trunnions 21—21, the axis of which lies in the approximate longitudinal vertical midplane of the craft. Ring 20, in turn, is pivotally mounted as at 22—22 on a sleeve 23 which is vertically slidable on the hub support 8 but keyed thereto as at 23a. It will be noted that the axis of trunnions 22—22 is offset to the rear of the rotor axis and the center of the cam track (the front of the aircraft and the direction of flight being indicated by the arrow T), the reason for this being brought out hereinafter.

By means of the described mounting of the cam member, this member may be tilted in any direction and may also be vertically displaced, any of which movements will affect the pitch of the blades.

However, because of the shape of the cam track 18, even with the cam ring retained in a given position of tilt, as the blades rotate the pitch thereof is periodically varied. By reference to Figure 2, it will be seen that the cam track is curved downwardly to a considerable extent toward the front. For reasons mentioned hereinafter, the lowest point of the cam is preferably located toward the forward end of the diameter $x$—$x$ (see Figure 1) which is the position at which the blades, if fixed in pitch, tend to reach the highest coning or flapping angle when the rotor rotates in the direction indicated by the arrow R in Figure 1. From Figure 2 it will be seen that, generally speaking, the cam track rises at each side from this forward low point to a rearward high point located adjacent the rear end of the diameter $x$—$x$, at which the blades would normally tend to reach their lowest coning or flapping angle. The cam track, however, does not lie accurately in a single inclined plane but is curved downwardly toward the low point, with the sharpness of curvature gradually diminishing toward the high point at the rear.

Bearing in mind that the control horn 15 for each blade engages the cam track at a point approximately 90° behind the blade, it will be seen that with the cam ring maintained in a given position (for example, the position of Figure 2) as the blades rotate they will experience changes of effective pitch in the following sequence:

Beginning with a blade in the position of the right-hand blade shown in Figure 1 (which, at this point, has approximately its minimum pitch, because of the fact that the control horn 15 therefor engages the cam track at approximately its highest point), as the blade advances through approximately the next quarter of a turn, its pitch is altered little, if any, because of the fact that the cam track 18 does not curve downwardly appreciably until the blade reaches approximately the forwardmost position. At this point, however, the blade pitch commences to increase, and increases progressively more rapidly through the next quadrant, until the blade is at the left hand side (180° from the position shown in Fig. 1), at which point the control horn 15 engages the cam track in the neighborhood of the lowest point. Proceeding further from this quadrant, the blade pitch again rather sharply decreases until the blade reaches the rearwardmost position, after which little, if any, pitch change occurs throughout the next quadrant bringing the blade back to the point of beginning (the position of the right-hand blade in Figure 1).

Generally speaking, therefore, as the blade moves rearwardly on the retreating side of the rotor from the forward position to the rearward position, it experiences a relatively abrupt increase and then decrease of effective pitch angle. On the other hand, as the blade moves through the half of the circle of rotation on the advancing side, the pitch is first decreased and then increased, although the magnitude of this variation is smaller than in the other half of the circle of rotation.

It will be seen that the above described sequence of pitch changes experienced by each blade produces effects counteracting or compensating for the tendency of the blade in translational flight to flap upwardly on the advancing side of the rotor and to fall on the retreating side. Furthermore, it will be noted that the pitch change is of smaller magnitude during the movement of the blade on the advancing side of the rotor than on the retreating side, this being of importance since the blade is subject to much higher velocity of air on the advancing side than on the retreating side, the lift for a given angle of attack being proportional to the square of the velocity, in view of which a larger change of pitch is necessary on the retreating side to produce a given effect.

The foregoing provides for substantial reduction of flapping of the blades in translational flight of the aircraft, and while an approximation of the required compensation for a given flight speed and loading may be obtained with an inclined cam track all parts of which lie in a single plane, more accurate compensation for a given speed and loading is obtainable in accordance with the present invention by adopting a cam track curvature of the character illustrated in Figure 2, and by locating the low and high points of the cam track in such positions that the maximum and minimum pitch of each blade is reached when the blades lie on a diameter substantially 90° from the diameter $x$—$x$ of maximum and minimum flapping which the blades would otherwise experience. With control horns 15 extended approximately 90° behind each blade, the diameter of the cam containing the low and high points of the cam track should approximately coincide with the diameter $x$—$x$, this being the arrangement illustrated in the drawing.

Finally, it is pointed out that to compensate for aerodynamic lag and the finite width of the blades, the control horn, as shown, is made slightly shorter than 90°.

To further clarify the senses of pitch change capable of achieving the compensation for flapping contemplated in accordance with this invention, it is noted that the advantages of the invention are more or less fully realized where the automatic periodic differential pitch change provides maximum amplitude of automatic periodic pitch decrease in that quadrant of the circle of rotation which is centered on a radius 90° beyond the point at which the blade tends to assume the minimum flapping angle, and provides maximum amplitude of automatic periodic pitch increase in a quadrant which is centered substantially diametrically opposite the quadrant of minimum pitch. Preferably, the amplitude of periodic pitch decrease from the point of minimum flapping angle to the point of minimum pitch is substantially less than the amplitude of the periodic pitch increase from the point of maximum flapping angle to the point of maximum pitch, in order more accurately to compensate for the different degrees of flapping tendency set up as a result of higher air speed on the blade on the advancing side of the rotor than on the retreating side.

With the foregoing arrangement for a given translational speed and loading of the aircraft, substantial elimination of periodic flapping is attainable, and preferably, the mechanism is so arranged as to provide this condition at a flight speed and loading approximating the normal cruising speed and normal loading for the particular craft.

As hereinbefore indicated, the present invention further contemplates superimposing manual control of incidence on the automatic control described. This may be achieved by controllably shifting the position of the cam ring 19, as by means of a pair of lateral push-pull tubes 146—146, which are connected with the ring in a vertical plane close to or containing the axis of trunnions 22—22. These two tubes may be coupled with any suitable manually operable mechanism for tilting the control ring, such as that disclosed in my prior patent referred to above.

While in said prior patent a pair of push-pull tubes are also shown for effecting tilt of the cam ring in a longitudinal plane, only one such push-pull tube is necessary, this one being indicated at 146a, it being understood that the tube 146a may be coupled with the control mechanism in my aforementioned patent. Still further, by simultaneously raising or lowering all three of the push-pull tubes (as by the mechanism illustrated in my prior patent) the cam ring will be bodily raised or lowered, in consequence of which the mean pitch of all blades will, in turn, be simultaneously increased or decreased. Since the specific form of mechanism employed for actuating the push-pull tubes forms no part of the present invention per se, such mechanism is not illustrated herein, it being of importance only that the mechanism provide "instinctive" control, i. e., a nose-up movement when the control stick is pulled rearwardly, a nose-down movement when the control stick is pushed forwardly, and a banking movement to left or right when the control stick is moved to the left or to the right.

To accomplish this "instinctive" control in a rotor system in which the blades are flappingly pivoted, the maximum periodic increase and decrease of the pitch of the blades should take place when the blades are located on the diameter approximately at right angles to the direction of control member displacement, this for the reason that the effect of pitch change in one position of the blade is felt in a plane at right angles thereto. Specifically, and to illustrate, a forward displacement of the control stick or equivalent element should produce periodic differential pitch variation such that the maximum amplitude of controlled pitch reduction is attained when the blade occupies a position on the transverse diameter on the advancing side of the rotor, and the maximum amplitude of controlled pitch increase is attained when the blade occupies a position on the transverse diameter on the retreating side of the rotor. This is accomplished in the mechanism shown by virtue of the extension of the control horns 15 rearwardly from the several blades approximately 90°, so that assuming the direction of translation indicated by the arrow T in Figure 1, the blade at the right-hand side will reach its maximum amplitude of controlled pitch reduction upon a tilting movement of the cam ring 19 downwardly at the forward side thereof.

Although the differential pitch control for lateral movements of the control stick (control of the aircraft in roll) is effected by actuation of the push-pull tubes 146—146 in the manner of my aforementioned patent, the longitudinal control as herein shown differs from the control of my earlier patent, primarily in that the axis for fore and aft tilt of the cam ring (formed by trunnions 22—22) is offset rearwardly of the rotor axis and of the center of the cam ring. Because of this, a given displacement of the longitudinal push-pull tube 146a brings about a greater displacement of the forward portion of the cam than of the rearward portion thereof. This, in turn, results in blade pitch change of greater amplitude on the retreating side of the rotor than on the advancing side thereof, and thereby provides more accurately balanced controlling effects at the two sides of the rotor when the aircraft is in translational flight and the blades are experiencing higher air speed on the advancing side than on the retreating side. As a result, differential or asymmetrical flapping of the blades in consequence of pitch change imposed for control purposes is minimized.

In conclusion, it is noted that the torsionally flexible pitch control blade flaps, the automatic periodic differential pitch change, and the manually controllable periodic differential pitch change, all contribute to more uniform position and more efficient loading of the blades, and especially a reduction of flapping movements of the blades set up as a result of higher air speed on the blade on the advancing side of the rotor than on the retreating side when the aircraft is in translational flight. In consequence, the rotor disc may be set at a lower and, therefore, more efficient angle, with reference to the forward flight path.

I claim:

1. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, controllable mechanism for shifting the line of action of the rotor force to maneuver the aircraft, and automatic mechanism operative in different positions of adjustment of said controllable mechanism to periodically vary the effective geometric pitch angle of the blade in a sense providing maximum amplitude of automatic pitch decrease in that quadrant of the circle of rotation which is centered on a radius 90° beyond the point at which the blade tends to assume the minimum flapping angle, and providing maximum amplitude of automatic pitch increase in a quadrant which is centered substantially diametrically opposite the quadrant of minimum pitch.

2. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, controllable mechanism for shifting the line of action of the rotor force to maneuver the aircraft, and automatic mechanism operative in different positions of adjustment of said controllable mechanism to periodically vary the effective geometric pitch angle of the blade in a sense providing maximum amplitude of automatic pitch decrease at a point approximately 90° beyond the point at which the blade tends to assume the minimum flapping angle, and providing maximum amplitude of automatic pitch increase at a point substantially diametrically opposite the point of minimum pitch.

3. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, controllable mechanism for shifting the line of action of the rotor force to maneuver the aircraft, and automatic mechanism operative in different positions of adjustment of said controllable mechanism to periodically vary the effective geometric pitch angle of the blade in a sense providing maximum amplitude of automatic pitch decrease in that quadrant of the circle of rotation which is centered on a radius 90° beyond the point at which the blade tends to assume the minimum flapping angle, and providing maximum amplitude of automatic pitch increase in a quadrant which is centered substantially diametrically opposite the quadrant of minimum pitch, the amplitude of automatic periodic pitch variation being such as to approximately compensate for and counteract the tendency for the blade to flap periodically during translational flight substantially at the normal cruising speed of the aircraft and with substantially normal loading of the aircraft.

4. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, and mechanism for periodically varying the effective geometric pitch angle of the blade in a sense providing maximum amplitude of pitch decrease in that quadrant of the circle of rotation which is centered on a radius 90° beyond the point at which the blade tends to assume the minimum flapping angle, and providing maximum amplitude of pitch increase in a quadrant which is centered substantially diametrically opposite the quadrant of minimum pitch, the amplitude of periodic pitch decrease from the point of minimum flapping angle to the point of minimum pitch being substantially less than the amplitude of the periodic pitch increase from the point of maximum flapping angle to the point of maximum pitch.

5. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, and mechanism for periodically varying the effective geometric pitch angle of the blade in a sense providing maximum amplitude of pitch decrease in that quadrant of the circle of rotation which is centered on a radius 90° beyond the point at which the blade tends to assume the minimum flapping angle, and providing maximum amplitude of pitch increase in a quadrant which is centered substantially diametrically opposite the quadrant of minimum pitch, the amplitude of periodic pitch decrease from the normal point of minimum flapping angle to the point of minimum pitch being substantially less than the amplitude of the periodic pitch increase from the normal point of maximum flapping angle to the point of maximum pitch, and the amplitudes of both the periodic pitch decrease and pitch increase being such as to approximately compensate for and counteract the tendency for the blade to flap under the influence of the normal translational flight substantially at the normal cruising speed of the aircraft and with substantially normal loading of the aircraft.

6. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, and mechanism for periodically varying the effective geometric pitch angle of the blade in a sense providing maximum amplitude of pitch decrease in that quadrant of the circle of rotation which is centered on a radius 90° beyond the point at which the blade tends to assume the minimum flapping angle, and providing maximum amplitude of pitch increase in a quadrant which is centered substantially diametrically opposite the quadrant of minimum pitch, the periodic effective pitch variation of the blade being greater in an inboard portion thereof than in an outboard portion thereof.

7. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, and controllable mechanism for periodically varying the effective geometric pitch angle of the blade including a control member displaceable in a fore and aft plane and connections between said member and the blade providing maximum amplitude of controlled pitch increase in that quadrant of the circle of rotation which is centered on a radius 90° beyond the direction of control member displacement in said fore and aft plane, and providing maximum amplitude of controlled pitch decrease in that quadrant which is centered substantially diametrically opposite the quadrant of maximum pitch, the amplitude of said pitch increase being substantially greater than the amplitude of said pitch decrease.

8. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, and mechanism for controlling the attitude of the aircraft in pitch including means for periodically varying the effective geometric pitch angle of the blade on the advancing and retreating sides of the rotor, the amplitude of controlled blade pitch variation on the retreating side of the rotor being substantially greater than the amplitude of controlled blade pitch variation on the advancing side of the rotor.

9. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, and mechanism for controlling the attitude of the aircraft in pitch including means for periodically varying the effective geometric pitch angle of the blade on the advancing and retreating sides of the rotor, the amplitude of controlled blade pitch variation on the retreating side of the rotor being substantially greater than the amplitude of controlled blade pitch variation on the advancing side of the rotor, and the amplitude of periodic variation of effective blade pitch further being greater at the inboard end of the portion of the blade thus affected than at the outboard end thereof.

10. In an aircraft, a bladed sustaining rotor with the blade or blades mounted with freedom for flapping movement, in which construction the blade tends to assume different flapping angles periodically in each cycle of rotation during forward flight and to reach maximum and minimum flapping angles at generally diametrically opposite points, controllable mechanism for shifting the line of action of the rotor force to maneuver the aircraft, and automatic mechanism operative in different positions of adjustment of said controllable mechanism to periodically vary the effective geometric pitch angle of the blade in a sense providing maximum amplitude of automatic pitch decrease in that quadrant of the circle of rotation which is centered in a radius 90° beyond the point at which the blade tends to assume the minimum flapping angle, and providing maximum amplitude of automatic pitch increase in a quadrant which is centered substantially diametrically opposite the quadrant of minimum pitch, said controllable mechanism including means for controlling the attitude of the aircraft in pitch operative to periodically vary the effective geometric pitch angle of the blade on the advancing and retreating sides of the rotor, the maximum amplitude of controlled periodic pitch increase (on the retreating side of the rotor) being substantially greater than the maximum amplitude of controlled periodic pitch decrease (on the advancing side of the rotor).

11. In an aircraft sustaining rotor having flappingly pivoted blades, pitch varying mechanism for the blades including for each blade a trailing edge flap and actuating means therefor providing for effective pitch change throughout a considerable length of the blade, the amplitude of pitch change being greater at the inboard end of the portion of the blade thus affected than at the outboard end thereof, angular movement of the latter portion being relatively restrained.

12. In an aircraft, a bladed sustaining rotor, and mechanism for periodically varying the effective geometric pitch angle of a rotor blade including means for restraining the angular movement at the outer end, thus providing for greater amplitude of periodic pitch variation in an inboard portion of the blade than in an outboard portion thereof.

13. In an aircraft, a bladed sustaining rotor, and mechanism for varying the effective geometric pitch angle of a rotor blade including means for increasing and decreasing the average pitch of the blade for each revolution thereof, and said mechanism further including means providing for periodic increase and decrease of the blade pitch in each revolution, the amplitude of effective geometric pitch variation being substantially different in different portions of the blade lengthwise thereof.

14. In an aircraft, a sustaining rotor incorporating a blade the effective geometric pitch angle of which is variable, controllable mechanism for periodically varying the effective blade pitch angle including an actuating member connected with the blade for rotation therewith, a cooperating non-rotative member, and pivot means mounting said non-rotative member for tilting movement on an axis offset from the axis of the rotor.

15. In an aircraft, a sustaining rotor incorporating a blade the effective geometric pitch angle of which is variable, controllable mechanism for periodically varying the effective blade pitch angle including an actuating member connected with the blade for rotation therewith, a cooperating non-rotative member, and pivot means mounting said non-rotative member for tilting movement on an axis offset from the axis of the rotor, said offset being so oriented as to provide greater amplitude of pitch variation when the blade passes on the retreating side of the rotor than when the blade passes on the advancing side of the rotor.

RALPH H. UPSON.